Feb. 22, 1966     KIYOSHI INOUE     3,236,996
WELDING APPARATUS

Filed Dec. 14, 1962     4 Sheets-Sheet 1

KIYOSHI INOUE
INVENTOR.

BY
AGENT

Feb. 22, 1966 KIYOSHI INOUE 3,236,996
WELDING APPARATUS

Filed Dec. 14, 1962 4 Sheets-Sheet 2

KIYOSHI INOUE
INVENTOR.

BY Karl F. Ross

AGENT.

KIYOSHI INOUE
INVENTOR.

BY Karl F. Ross

AGENT.

United States Patent Office 3,236,996
Patented Feb. 22, 1966

3,236,996
WELDING APPARATUS
Kiyoshi Inoue, 182 3-Chome, Tamagawayoga-machi, Setagaya-ku, Tokyo-to, Japan
Filed Dec. 14, 1962, Ser. No. 244,798
Claims priority, application Japan, Dec. 14, 1961, 36/45,550, 36/45,551; Aug. 10, 1962, 37/33,022; Sept. 29, 1962, 37/42,502; Nov. 30, 1962, 37/71,415
7 Claims. (Cl. 219—86)

My present invention relates to an improved fusion welding apparatus of the general type wherein two electrically conductive bodies are welded together along an interfacial zone under pressure applied between a pair of electrodes, each of which engages one of the bodies.

Apparatus of this type is disclosed in my Patent No. 3,060,306, issued October 23, 1962. The structure shown in this patent is only representative of most hitherto existing types of spot-welding, lap-welding, seam-welding and metal-cladding machines operating upon the resistance heating principle. In all such apparatus the two bodies are clamped between the electrodes under spring or mechanical pressure for the duration of the welding. Generally, the clamping force is derived from the potential energy of a force-storing member such as the aforementioned spring or is continuously applied via levers having mechanical advantages and force-transmitting capabilities. It will thus be apparent that these prior-art structures were highly unwieldy and extremely expensive to operate. Moreover, these known welding machines were frequently characterized by a low efficiency deriving from the fact that the welding transformer often had a high inherent residual flux which lowered its output and required considerably higher input currents to overcome the effect of the residual flux.

It is an object of the present invention to provide an improved fusion welding apparatus wherein the aforementioned disadvantages are obviated.

Another object of the invention is to provide improved means for clamping together bodies to be welded which can be of small dimensions without reducing its effectiveness.

Yet another object of the invention is to provide a force-transmitting member of unusual effectiveness in the transfer of kinetic energy to another body.

Still another object of the invention is to provide an inexpensive electromagnetic solenoid capable of operating at high rates and which can have a relatively limited stroke so as to be suitable for incorporation in an electrically operated switch or the like.

A further object of the invention is to provide a welding circuit wherein the negative effects of residual flux can be reduced or eliminated. A corollary object is to realize the reduction of residual flux in any transformer circuit operating at low frequencies.

The above and other objects, which will be apparent hereinafter, are attained in accordance with the invention by providing a welding apparatus wherein a pair of juxtaposed electrodes are relatively displaceable toward and away from each other and pressure means is provided for intermittently displacing the electrodes to urge the bodies toward each other at an interfacial zone at which welding is to be carried out. A circuit means is connected across the electrodes for passing an electric current having a peak value through the bodies at this interfacial zone while a control means is coupled with the circuit means for delaying passage at least of the peak current until the pressure means has biased the electrodes against the bodies. It is a principal feature of the present invention to form the pressure means so that it includes an impacting member which is displaceable independently of at least one of the electrodes but is in force-transmitting relationship therewith to apply the kinetic energy of this member to the electrode. Thus, in contradistinction to earlier devices, the two bodies are clamped together under the effect of the kinetic energy of a moving member rather than by a spring or the consistently applied force of conventional clamping arms. While the member may comprise any relatively massive reciprocating body, which can be displaced with the aid of mechanical and electrical means (e.g. hydraulic or pneumatic cylinders or electric motors), it is preferred to employ an electromagnetic solenoid as a power means for applying the body to the electrode. Advantageously, this solenoid will operate in conjunction with oscillating means for continuously reciprocating the body so that it need only apply a biasing force to bring the rapidly moving member into contact with the electrode. The power means and the magnetic oscillating means may, conveniently, be incorporated in a control or timing circuit which maintains the energization of the power means in phase with the oscillations of the member.

According to another feature of the invention, the control means is provided with a timing circuit which includes the impacting member and the electrode for energizing the main circuit means generally with a time delay. Thus, the impacting member serves to initate passing of the welding current only after the electrodes have clamped the two bodies together. The circuit means may include a breakdown element operably connected with the timing circuit which is poled to render the element conductive upon contact between the impacting member and the electrode. Alternatively, the control means may include a saturable-core reactor which is biased into a conductive condition upon such contact. It should, however, be noted that the present invention also contemplates the employment of a timing relationship independent of the impacting member. Therefore, the circuit means may include a source of periodic electric current which energizes the power means slightly in advance of the passage of the peak current through the welding electrodes. This result may be attained with the aid of a phase-shifting network incorporated in the timing circuit for the power solenoid. It is also possible to trigger the impacting member periodically and to so constitute the circuit means that the peak current does not pass until the clamping action has been carried out. The circuit means may, in this case, be provided with a resonant network which is ineffective until the electrodes clamp the bodies together and then acts to build up the welding power.

Another aspect of the invention resides in the provision of a circuit means which includes a transformer, generally operating at relatively low frequencies up to, say, 100 cycles per second, which sustains a residual flux capable of reducing its output, and compensating means connected across the transformer means for reducing this flux. The transformer circuit may, consequently, have a primary winding connected across the source of periodic current and a secondary winding connected across a load with the core inductively coupling the two windings. The compensating means can thus be included in circuit with the secondary winding and may include capacitive means bridging at least part of the latter to form therewith a resonant circuit having a characteristic period less than the duration of the residual flux. Depending upon the input frequency, the residual flux may have a duration equal at least to half the period of the input current so that it generally tends to reduce the transformer output during successive cycles. The resonant circuit dissipates the residual flux at a relatively high rate. The secondary winding of the transformer may thus be provided with a plurality of taps while the capacitive means includes a plurality of capacitors each bridging a pair of the taps.

A more particular feature of the invention resides in the provision of a compensating means which includes a biasing network bridging the secondary winding for applying a biasing current thereto in such direction as to nullify the residual flux. This network advantageously includes an inductively reactive circuit element which shapes the biasing wave and may also include a load resistor. The network may be energized by a source of direct current connected across this resistor or via a source of periodic (e.g. alternating) current inductively connected to the network.

According to still another aspect of the invention the force-transmitting or impacting member includes means forming a chamber provided with at least one impact surface and a mass of discrete magnetically permeable particles displaceable within said chamber into contact with this surface. In addition, magnetic means is provided for effecting a substantially inelastic collision of the mass with the surface to transfer substantially all of the relative kinetic energy of the mass to the member. The magnetic means may include a permanent magnet disposed in the chamber and forming the impact surfaces while a second permanent magnet may be disposed in the chamber remote from the first to provide two stable positions for the magnetic mass. It will thus be apparent that the member may constitute the head of a hammer (e.g. of a golf club) wherein the mass is transferred from the impacting surface to the other magnet during the potential energy (nonworking) stroke and, upon contact of the member with a body impinges upon the impact surface with a minimum of rebounding as a consequence of the magnetic means. The magnetic means may also include a solenoid coil surrounding the chamber for applying an axial force to the mass in the direction of the impact surface. This construction is particularly suitable for an impact member of the type previously described with reference to welding heads and for switch armatures which permit greater efficiency with smaller dimensions than it was possible heretofore.

The above and other objects, features and advantages of the invention will become more readily apparent from the following detailed description, reference being made to the accompanying drawing in which.

Figures 1, 2, 8:
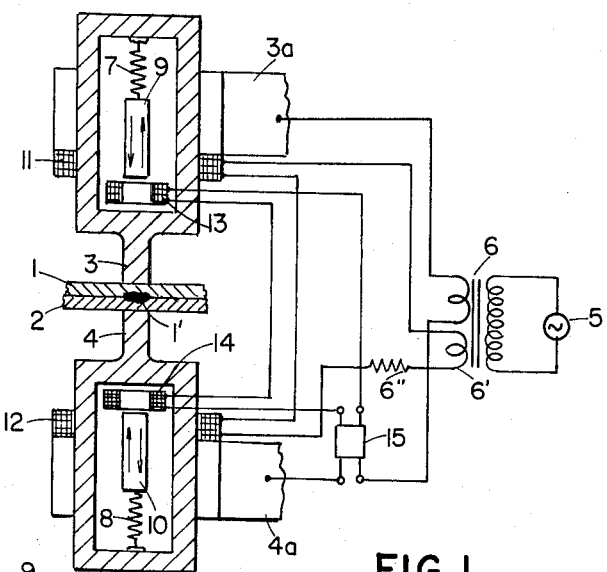
FIG. 1 is a cross-sectional view through the welding heads of a spot welder with the control circuit therefor shown schematically.
FIG. 2 is a circuit diagram of a detail of the timing circuit.
FIG. 8 is an axial cross-sectional view through an impact member suitable for use with the embodiments of FIGS. 1–6.

In FIG. 1 I show a device for spot welding two plates 1 and 2 together along their interfacial zone 1' with the aid of a pair of electrodes 3 and 4 which bear slightly against these bodies and are mounted upon respective arms 3a, 4a resiliently displaceable toward and away from the plates. The conductive arms 3a, 4a are connected across the secondary winding of a transformer 6 via a timing and switch circuit 15 which is best shown in FIG. 2. The transformer 6 is energized via a periodic (alternating) current source 5 of low frequency which is bridged across the primary winding. The welding heads 3, 4 are each hollow and contain a vibrating magnetically permeable impacting member 9, 10 resiliently mounted upon springs 7, 8, respectively, and oscillated in phase with the transformer input by coils 11 and 12 connected in series with a further secondary winding 6'. A resistance 6'' in this circuit is intended to indicate the line resistance. The power means for driving the impacting members 9 and 10 is constituted by a pair of solenoids 13, 14 which are coupled with the transformer 6 via a timing circuit 15b (FIG. 2). The solenoids 13 and 14 are fixed within the heads 3 and 4, respectively. In operation, the impact bodies 9, 10 are vibrated in phase with the welding current via coils 11, 12 and are thus not at rest with considerable inertia but can be periodically applied to the welding electrodes 3, 4 by the solenoids 13, 14 to transfer all of their kinetic energy to these electrodes and clamp the bodies 1 and 2 together. Immediately thereafter, the welding current is passed through these electrodes to fuse the bodies together in their interfacial zone.

As indicated in FIG. 2, the timing circuit 15b comprises a transistor 16 whose emitter/base circuit includes a battery 17 and the solenoids 13, 14 connected in series. This transistor, which in its nonconductive state blocks the passage of direct current to the solenoids 13, 14, is provided with a collector/emitter circuit including a biasing battery 18 and a resistor 19. The collector is tied to the grid of a breakdown-switching element such as a thyratron 20 as well as to the cathode of a further thyratron 21, the two thyratrons comprising the switching portion 15a of control circuit 15. When an alternating input from the secondary winding of transformer 6 is applied at terminal 22 to thyratron 21, it increases the positive polarity of the grid thereof, rendering it conductive, and polarizes simultaneously the plate of thyratron 20 while driving the transistor 16 into its conductive condition. Current thus passes through the solenoids 13 and 14 to apply the members 9 and 10 to the electrodes 3 and 4 in order to clamp the bodies 1 and 2 together. Immediately thereafter, the grid potential of thyratron 20 increases to effect breakdown of the switching element and the completion of the main welding circuit to the electrodes 3 and 4 via terminal 23. Thus, the welding current only passes through the electrodes after they have been clamped against the bodies by the impact members so that sparking is avoided.

Figure 3:
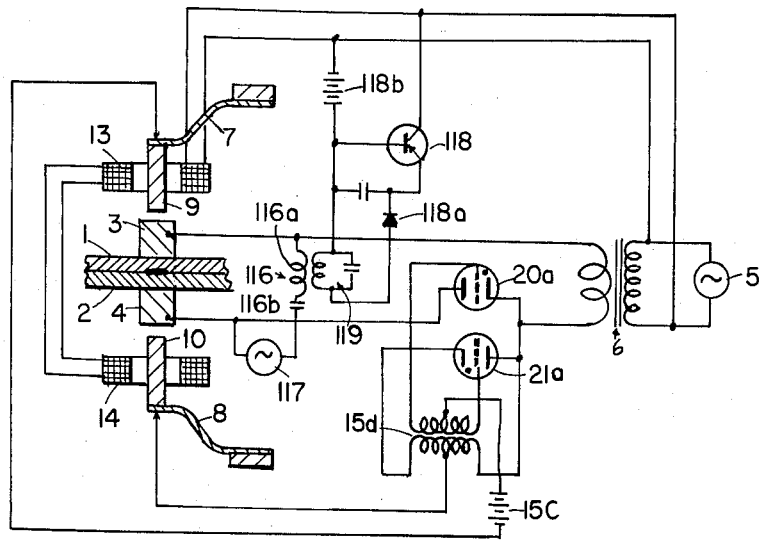
FIG. 3 is a view similar to FIG. 1 illustrating a modification of the invention.

In FIG. 3 I show modified arrangements for carrying out the timing of the energization of the power solenoids 13 and 14 with respect to the electrodes 3 and 4. When a low-frequency welding operation is to be made, the low-frequency source 5 energizes the parallel-connected solenoids 13, 14 directly. The impacting members 9, 10 are connected in series with a battery 15c to the center taps of a transformer 15d one winding of which is bridged across the cathode and plates of the push-pull thyratrons 20a, 21a while the other winding energizes the grids thereof. When the impact members 9, 10 contact the electrodes 3, 4 to apply clamping force to bodies 1 and 2, the grids of the thyratrons are driven positive to render conductive either thryatron 20a or 21a, depending upon the polarity of the portion of the input cycle during which the impact took place. The conductive thyratron supplies the main welding current to the electrodes 3, 4 to carry out the fusion operation.

This figure also illustrates a high-frequency welding technique wherein a high-frequency alternating-current source 117 is connected in series with a resonant network 116 consisting of a capacitor 116b and an inductor 116a in series, across the welding electrodes 3, 4. A timing circuit 119 is inductively coupled with the high-frequency energizing circuit 116, 117 and periodically triggers the transistor 118 via a rectifier 118a to permit direct current from the battery 118b to pass through the solenoids 13 and 14 and drive the impact members 9 and 10 against the electrodes 3 and 4. The transistor 118 thus constitutes an electronic switch-triggered in step with the high-frequency transformer 116 to energize solenoids 13, 14.

Figure 4:
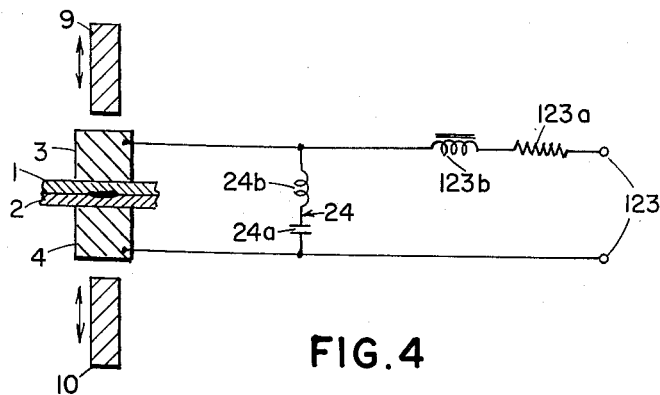
FIGS. 4, 5 and 6 are circuit diagrams of further modifications.

The arrangement shown in FIG. 4 makes use of a direct-current source 123 in series with the line resistance 123a and a pulse-shaping inductor 123b to pass the main welding current through the electrodes 3, 4. The latter bear only lightly against the bodies 1, 2 so that substantially no current flows until impact by members 9, 10. Upon such impact the circuit is effectively closed to charge the resonant network 24, consisting of the series-connected capacitor 24a and inductor 24b, and fuses the bodies 1, 2 together. The resonant network results in a decrease of the welding current after the fusion, thereby permitting the cycle to repeat.

Figure 5:
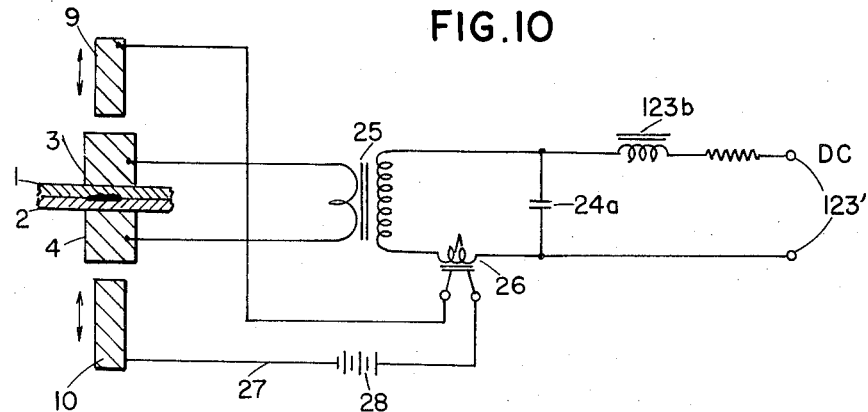

In the embodiment shown in FIG. 5, source 123' in conjunction with the choke 123b and capacitor 24a produces a pulsating or alternating current which is applied to the electrodes 3, 4 by a coupling transformer 25. The source is, however, in series with the saturable reactor 26 whose biasing winding is tied to the impact members 9, 10 via a biasing battery 28 in a timing circuit. It will be immediately apparent that contact of both impact members 9, 10 with their respective electrodes 3, 4 causes the passage of a direct current through these members and the bodies to render the reactor 26 conductive. A welding pulse is thus applied to the electrodes 3, 4 after a slight delay as determined by the inductance 123b.

Figure 6:
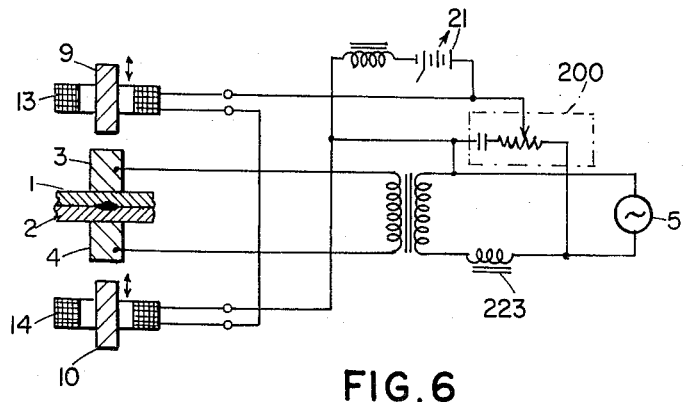
Figure 7:
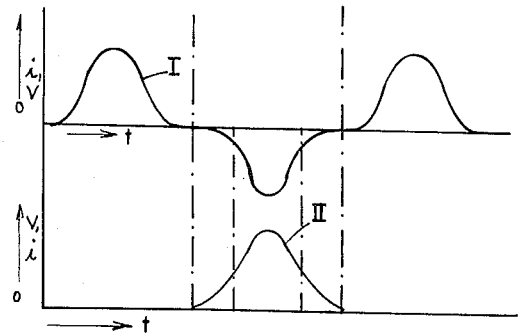
FIG. 7 is a graph showing current relationships for the circuit elements illustrated in FIG. 6.

In the arrangement shown in FIG. 6, the solenoids 13 and 14 are connected to the source 5 via a phase shifter 200 to actuate the members 9, 10. A biasing battery 21 maintains a constant potential across the solenoid which is supplemented by the current derived from the phase-shifting network. A choke 223 serves to delay passage of the welding current until impact has been made. This may be seen from FIG. 7 wherein graph I shows the current passing through the input circuit. Choke 223 delays the rise of the welding current until energization of the solenoids 13, 14 (graph II).

While the impacting members shown in FIGS. 1–6 are generally composed of solid magnetizable bodies, it should be noted that such bodies tend to rebound from the electrodes 3, 4 and thus take up kinetic energy from these electrodes after impact. In FIG. 8 I show an arrangement wherein such rebounding is reduced effectively to zero. In this arrangement the solenoid 306, which has a similar function as the solenoids 13, 14, displaces a mass of discrete magnetizable particles 304a in the direction of arrows 308a, 308b into engagement with impact surfaces 302, 303. Surface 302 may be rigid with a support 301 (e.g. one of the welding arms) while the other is disposed above an electrode and, upon displacement in the direction of arrows 309, will transmit force to the latter. An expandable bellows-type chamber 305 contains the particles 304a and is surrounded by a coil spring 304 which serves to restore the impact plate 303 to an intermediate position subsequent to each displacement. When the solenoid 306 is energized via a source 307, the alternating flux displaces the mass of particles into alternate contact with the impact surfaces 302, 303 to vibrate the impact member as previously mentioned. Each collision of the particles with these surfaces is substantially inelastic since a magnetic force is present to hold them thereagainst.

Figure 9:
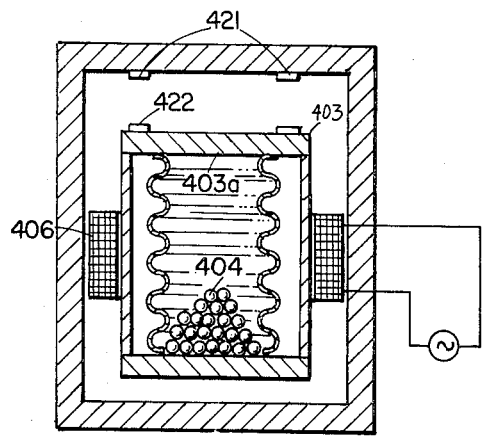
FIG. 9 is a view similar to FIG. 8 of a flux-transmitting element operating on the same principles.

The solenoid switch shown in FIG. 9 operates according to a similar principle with the entire member 403 forming a housing for the pellets 404 and being displaceable against the force of a spring (not shown) in the direction of a pair of contacts 421. Thus, the axial magnetic force applied by the solenoid 406 to the pellets 404 will cause them to impinge upon the surface 403a, transfer their kinetic energy to member 403 and close a circuit between contacts 421 and 422 carried by the member.

Figure 10:
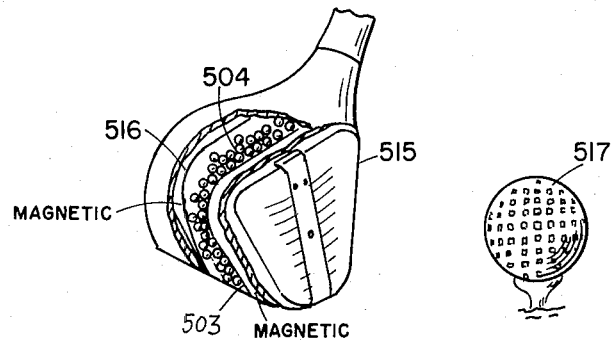
FIG. 10 is a perspective view of a golf-club head, partly broken away, employing this principle.

The same principle as applied to force-transmitting members such as hammers, mallets, golf clubs and the like is illustrated in FIG. 10 wherein the pellets 504 can be attracted either to the magnetic impact surface 503 at the impact face 515 of the head or to another magnetic surface 516 remote therefrom. When the golf club is raised in the course of its potential energy stroke, the mass of pellets 504 are displaced against the second magnet 516 within the hollow chamber formed in the club head. Upon impact with the ball 517, however, the mass of pellets, moving at a high velocity, impinge upon the surface 503 to transmit substantially all of their kinetic energy to the ball. The magnetic surfaces prevent rebounding of the particles and loss of kinetic energy in this manner.

Figure 11:
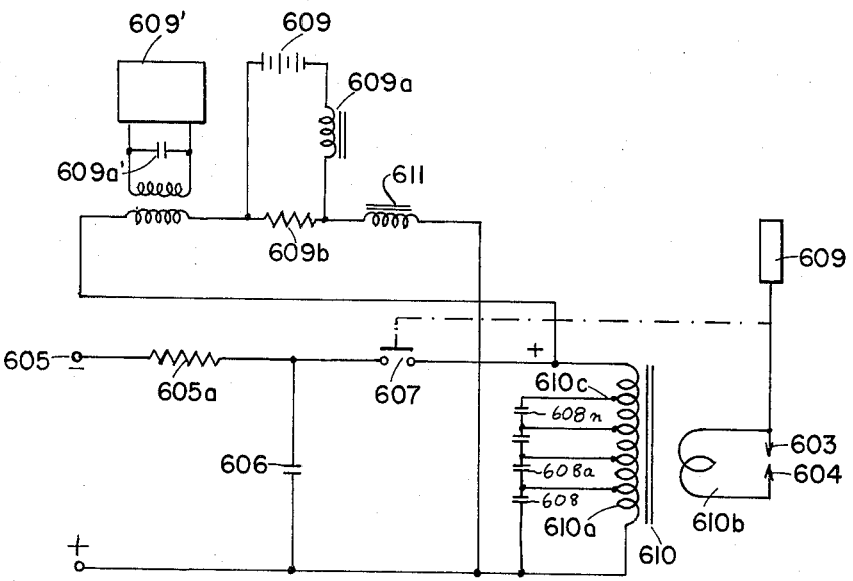
FIG. 11 is a diagram of a circuit arrangement for a transformer system suitable for use with any of the welding devices.

In FIG. 11 I have shown a circuit suitable for use in any of the welding devices previously described and capable of limiting or eliminating residual flux which frequently reduces the output of such transformers below acceptable levels. An alternating-current source 605 is connected in series with the line resistance 605a across a capacitor 606 and in series with a switch 607 across the primary winding 610a of a transformer 610 whose secondary winding 610b energizes the electrodes 603, 604 of a welding device. The impacting elements (not shown) for applying these electrodes to the workpiece are energized by a timing circuit 609 which also closes the switch 607 to energize the primary winding after the bodies have been clamped between the electrodes. When the terminals of this alternating-current source 605 are poled as indicated on the left-hand side of FIG. 11, the welding action takes place so that a residual flux develops in the core of the transformer, thereby reducing the efficiency of the latter and the load current. To obviate this effect, I provide a compensating system comprising a current source and an inductance 611 so poled as to counteract the residual flux. The current source may include a battery 609 in series with a choke 609a across a load resistor 609b in series with inductor 611 or an alternating-current generator 609' whose resonant network 609a' is inductively coupled with the compensating circuit. It will be apparent, therefore, that the flux passing through the transformer 610 when the compensating network and source 605 are oppositely poled, i.e. during the welding period, will be equal to the sum of the flux applied by each source. The welding current can thus be increased without exceeding the capacity of the transformer.

Another method of dissipating the residual flux is to provide capacitive means forming a resonant network with part of the primary winding 610a. Thus, the latter may be provided with a plurality of taps 610c each pair of which is bridged by a respective capacitor 608, 608a, . . . 608n. The resonant network has a characteristic frequency substantially higher than the low frequency of source 605 so that dissipation of the residual flux can be carried out.

The invention herein described and illustrated is believed to admit of many modifications within the ability of persons skilled in the art, all such modifications being deemed included within the spirit and scope of the invention as defined in the appended claims.

I claim:

1. In an apparatus for the fusion welding of two electrically conductive bodies along an interfacial zone, in combination, a pair of juxtaposed electrodes relatively displaceable toward and away from each other and respectively engageable with said bodies; pressure means for intermittently displacing said electrodes to urge said bodies toward each other at said zone; circuit means including said electrodes for passing an electric current having a peak value through said bodies at said zone; and control means coupled with said circuit means for delaying passage of at least the peak current through said bodies until said pressure means has biased said electrodes against said bodies, said pressure means including a magnetically permeable impacting member displaceable independently of but in force-transmitting relationship with one of said electrodes, and solenoid means on the said one of said electrodes for intermittently applying said member to said one electrode, thereby transmitting thereto the kinetic energy of said member; and magnetic means for oscillating said body in the direction of displacement thereof intermediate successive impacts with said one electrode.

2. The combination defined in claim 1 wherein said control means is provided with a timing circuit including said member and said one electrode for energizing said circuit means.

3. The combination defined in claim 2 wherein said circuit means includes a break-down element, said timing circuit being poled to render said element conductive upon contact between said member and said one electrode.

4. The combination defined in claim 2 wherein said circuit means includes a saturable-core reactor, said timing circuit biasing said reactor into a conductive condition upon contact between said member and said one electrode.

5. The combination defined in claim 1 wherein said circuit means includes a source of periodic electric current, said control means including a timing circuit energized by said source for actuating said power means.

6. In a fusion-welding device for the joining of two electrically conductive bodies along an interfacial zone, in combination, a pair of juxtaposed electrodes relatively displaceable towards and away from each other and respectively engageable with said bodies from opposite sides thereof; a pair of impacting members each displaceable independently of and in force-transmitting relationship with a respective one of said electrodes, said impacting members being magnetically permeable; a pair of solenoid coils each substantially fixedly positioned with respect to a respective one of said electrodes and surrounding the corresponding impacting member for magnetically displacing it against the respective electrode to transmit thereto its kinetic energy; first circuit means connected across said electrodes for applying thereto a pulsed electric current adapted to pass through said bodies and weld them together at said interfacial zone; second circuit means connected across both of said solenoid coils for simultaneously magnetically driving said impacting members against said electrodes; means interconnecting said first and second circuit means for energizing said solenoid coils and said electrodes with the identical cadence; and magnetic means for oscillating said impacting members in the direction of displacement thereof between successive impacts of said impacting members with the respective electrodes but substantially in phase with said impacts.

7. The combination defined in claim 6, wherein said means for interconnecting said first and second circuit includes an electronic switch triggered in the cadence of the pulses applied by said first circuit means to said electrodes.

References Cited by the Examiner
UNITED STATES PATENTS

| | | | |
|---|---|---|---|
| 2,014,082 | 9/1935 | Fox | 219—128 X |
| 2,015,156 | 9/1935 | Richmond. | |
| 2,272,968 | 2/1942 | Dyer | 219—86 |
| 2,383,695 | 8/1945 | Thacker | 219—86 |
| 2,792,536 | 5/1957 | Immel. | |
| 2,802,146 | 8/1957 | Van Ness | 219—116 X |
| 3,011,045 | 11/1961 | Stolz et al. | 219—86 |
| 3,053,974 | 9/1962 | Simmie et al. | 219—116 |
| 3,056,903 | 10/1962 | Neidhardt | 219—116 X |

RICHARD M. WOOD, *Primary Examiner.*

JOSEPH V. TRUHE, Sr., *Examiner.*